(12) United States Patent
Sakib et al.

(10) Patent No.: US 12,468,814 B2
(45) Date of Patent: *Nov. 11, 2025

(54) FIRMWARE POLICY ENFORCEMENT VIA A SECURITY PROCESSOR

(71) Applicant: Microsoft Technology Licensing, LLC, Redmond, WA (US)

(72) Inventors: Nazmus Sakib, Seattle, WA (US); Bryan David Kelly, Carnation, WA (US); Ling Tony Chen, Bellevue, WA (US); Peter David Waxman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 58 days.

This patent is subject to a terminal disclaimer.

(21) Appl. No.: 18/508,959

(22) Filed: Nov. 14, 2023

(65) Prior Publication Data

US 2024/0211601 A1 Jun. 27, 2024

Related U.S. Application Data

(63) Continuation of application No. 17/337,251, filed on Jun. 2, 2021, now Pat. No. 11,853,428.

(51) Int. Cl.
*G06F 21/57* (2013.01)
*G06F 9/54* (2006.01)
*G06F 21/55* (2013.01)

(52) U.S. Cl.
CPC ........... *G06F 21/572* (2013.01); *G06F 9/541* (2013.01); *G06F 21/554* (2013.01); *G06F 2221/033* (2013.01)

(58) Field of Classification Search
CPC ...... G06F 21/572; G06F 9/541; G06F 21/554; G06F 2221/033
See application file for complete search history.

(56) References Cited

U.S. PATENT DOCUMENTS

| 7,975,084 B1* | 7/2011 | Kalbarga | G06F 13/102 710/13 |
| 2014/0096260 A1* | 4/2014 | Triantafillou | G06F 21/57 726/26 |
| 2017/0359171 A1* | 12/2017 | Haridas | G06F 21/57 |

(Continued)

OTHER PUBLICATIONS

Office Action Received for European Application No. 22728710.9, mailed on Jan. 9, 2024, 3 pages.

*Primary Examiner* — Hyun Soo Kim

(57) ABSTRACT

Embodiments described herein are directed to firmware policy enforcement of a computing device. For example, a security processor of the computing device is utilized to boot the computing device. During a boot session, the security processor loads and executes specialized firmware. The specialized firmware, when executed, causes the security processor to determine whether other types of firmware to be executed on the computing device is in compliance with a policy specified by the specialized firmware. Based at least on a determination that the other firmware is in compliance with the policy, the security processor executes the other firmware. Based at least on a determination that the other firmware is not in compliance with the policy, the security processor performs a mitigation with respect to the other firmware.

20 Claims, 5 Drawing Sheets

(56) References Cited

U.S. PATENT DOCUMENTS

| | | | | |
|---|---|---|---|---|
| 2018/0089435 | A1* | 3/2018 | Zander | G06F 21/577 |
| 2019/0363894 | A1* | 11/2019 | Kumar Ujjwal | H04L 9/3268 |
| 2021/0211281 | A1* | 7/2021 | Park | G06F 21/74 |
| 2021/0406381 | A1* | 12/2021 | Heisrath | H04L 63/12 |
| 2022/0006653 | A1* | 1/2022 | Ghetie | H04L 63/0428 |

* cited by examiner

FIRMWARE POLICY ENFORCEMENT VIA A SECURITY PROCESSOR

CROSS-REFERENCE TO RELATED APPLICATIONS

This application is a continuation of U.S. patent application Ser. No. 17/337,251 filed Jun. 2, 2021, entitled "Firmware Policy Enforcement Via a Security Processor," which is incorporated herein by reference in its entirety. To the extent appropriate a claim of priority is made.

BACKGROUND

Firmware is a specific class of computer software that provides the low-level control for a device's specific hardware. Firmware, such as the basic input/output system (BIOS) firmware of a computing device may only contain basic functions of a device and may only provide services to higher-level software. Typical examples of devices containing firmware are embedded systems, consumer appliances, computers, and computer peripherals (e.g., a hard drive, a solid state drive, a processor (e.g., a CPU), a microcontroller, a graphics card, etc.).

An owner of a device may establish rules or a policy as to how the device is to be used and/or which firmware and/or software is to be installed on the device. Generally, the rules are enforced by an operating system process. As such, the policy enforcement mechanism is susceptible to malware that runs on the operating system, thereby opening the door for a malicious entity to hijack the firmware and insert their own malicious code into the firmware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to firmware policy enforcement of a computing device. For example, a security processor of the computing device is utilized to boot the computing device. During a boot session, the security processor loads and executes specialized firmware. The specialized firmware, when executed, causes the security processor to determine whether other types of firmware to be executed on the computing device is in compliance with a policy specified by the specialized firmware. Based at least on a determination that the other firmware is in compliance with the policy, the security processor executes the other firmware. Based at least on a determination that the other firmware is not in compliance with the policy, the security processor performs a mitigation with respect to the other firmware.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
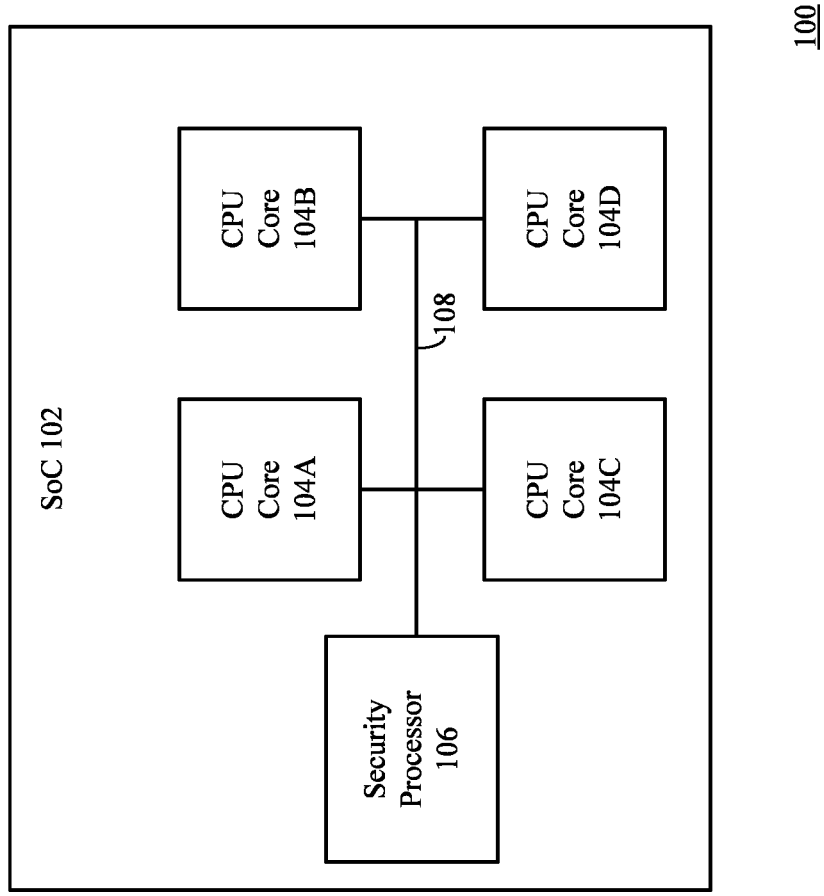
FIG. 1 depicts a block diagram of a system configured to enforce a firmware policy during a boot session of a computing device in accordance with an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Embodiments described herein are directed to firmware policy enforcement of a computing device. For example, a security processor of the computing device is utilized to boot the computing device. During a boot session, the security processor loads and executes specialized firmware. The specialized firmware, when executed, causes the security processor to determine whether other types of firmware to be executed on the computing device is in compliance with a policy specified by the specialized firmware. Based at least on a determination that the other firmware is in compliance with the policy, the security processor executes the other firmware. Based at least on a determination that the other firmware is not in compliance with the policy, the security processor performs a mitigation with respect to the other firmware.

The security processor is utilized to load and execute firmware, whereas the main central processing unit of the computing device is utilized to execute the computing device's operating system and software applications. That is, the operating system does not execute on the security processor. As such, the security processor is protected from malicious software designed to exploit vulnerabilities of the operating system to perform malicious activities.

For instance, FIG. 1 depicts a block diagram of a system 100 configured to enforce a firmware policy during a boot session of a computing device in accordance with an example embodiment. As shown in FIG. 1, system 100 comprises a system-on-a-chip (SoC) 102. SoC 102 comprises a plurality of CPU cores 104A-104D and a security processor 106. It is noted that while SoC 102 includes four CPU cores, SoC 102 may include any number of CPU cores. CPU cores 104A-104D and security processor 106 are communicatively coupled via a bus interconnect 108 by which CPU cores 104A-104D and/or security processor 106 may transmit and/or receive data, control signals, and/or other information signals therebetween. Bus interconnect 108 may be implemented via one or more wires, traces, or other forms of routing/interconnect; however, the embodiments described herein are not so limited. Each of CPU cores 104A-104D may be configured to fetch, decode, execute, and commit instructions and to process data according to a particular instruction set architecture (ISA), such as, but not limited to an x86 instruction set. In accordance with an embodiment, CPU cores 104A-104D may be 32-bit or 64-bit complex instruction set computer (CISC)-based processor cores; although the embodiments described herein are not so limited. Security processor 106 and CPU cores 104A-104D may be implemented on the same die. One or more of CPU cores 104A-104D is configured to execute an operating system of the device in which SoC 102 is included, whereas security processor 106 may not be configured to execute an operating system. Thus, security processor 106 is securely isolated from any malware configured to be executed via the operating system, as such malware is unable to be executed on security processor 106. Examples of operating systems, include, but are not limited to, the MICROSOFT® WINDOWS® Operating System (OS), published by Microsoft Corporation of Redmond, Washington, the LINUX® operating system and other UNIX® variants, etc.

Security processor 106 may comprise a hardware security module (or platform) that is configured to manage public keys, perform encryption and decryption functions for digital signatures, and/or perform other cryptographic functions. In accordance with an embodiment, security processor 106 is configured to determine whether firmware loaded for SoC 102 and/or a device in which SoC 102 is included is in compliance with a policy. For example, SoC 102 may be loaded with firmware that stores a policy for other types of firmware loaded by SoC 102. If a particular type of firmware is determined to be in compliance with the specified policy, the firmware is executed by security processor 106. In contrast, if a particular type of firmware is determined to not be in compliance with the specified policy, one or more mitigations are performed with respect to the particular type of firmware. Examples of devices in which SoC 102 may be included include, but are not limited to, a desktop computer, a laptop computer, a server, a tablet computer, a smart phone, etc., and/or various components included therein, including, but not limited to, a hard drive, a solid state drive, a processor (e.g., a CPU), a microcontroller, a graphics card, etc. Additional details regarding policy enforcement process are described below with reference to FIG. 2.

Figure 2:
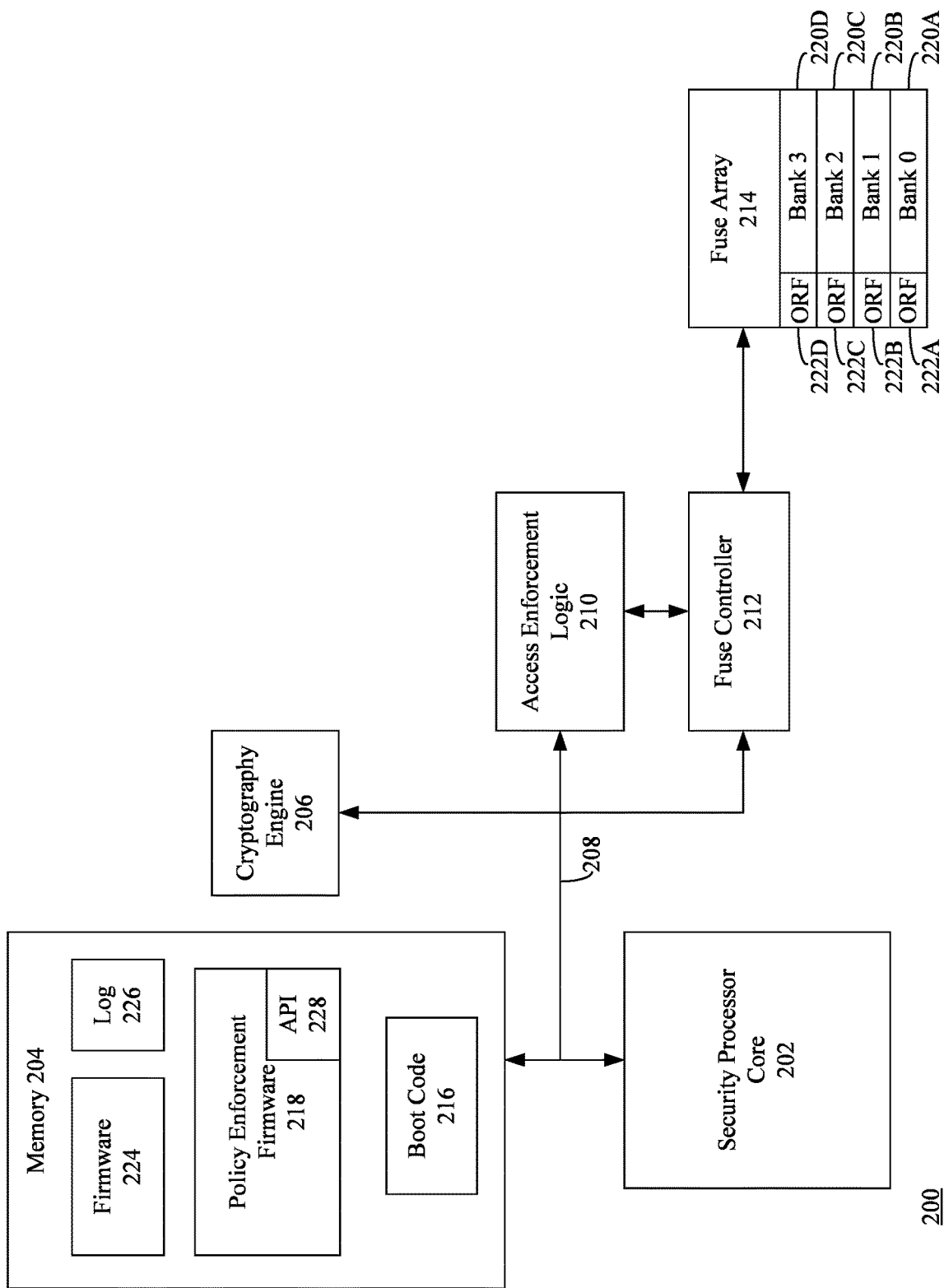
FIG. 2 is a block diagram of a security processor in accordance with an example embodiment.

For example, FIG. 2 is a block diagram of a security processor 200 in accordance with an example embodiment. Security processor 200 is an example of security processor 106, as described above with reference to FIG. 1. As shown in FIG. 2, security processor 200 comprises a security processor core 202, a memory 204, an Cryptography engine 206, access enforcement logic 210, a fuse controller 212, and a fuse array 214. Security processor core 202, memory 204, Cryptography engine 206, access enforcement logic 210, fuse controller 212, and fuse array 214 are communicatively coupled via a bus interconnect 208, which is an example of bus interconnect 108, as described above with reference to FIG. 1. Bus interconnect 208 may be communicatively coupled to other components not described with reference to FIG. 2, including, but not limited to, CPU cores 104A-104D, as described above with reference to FIG. 1.

Security processor core 202 may be a real-time processor core that is optimized for high performance, hard real-time and safety-critical applications. An example of such a processor core includes, but is not limited to, the ARM Cortex-R processor developed by ARM Holdings of Cambridge, United Kingdom. In accordance with an embodiment, security processor core 202 may be a 32-bit or 64-bit reduction instruction set computer (RISC)-based processor core; although the embodiments described herein are not so limited.

Memory 204 stores boot code 216 and various types of firmware 224. Boot code 216 comprises code (or instructions) that are executable by security processor core 202 during a boot session (i.e., when a device in which security processor 200 is included is starting up after being powered on or reset). Examples of firmware 224 include, but are not limited to, basic input/output system (BIOS) firmware, UEFI (unified extensible firmware interface) (UEFI) BIOS firmware, and various device-specific firmware, such as hard disk drive firmware, solid state drive firmware, video BIOS firmware, etc. It is noted that firmware 224 is representative of these various types of firmware (i.e., firmware 224 may represent more than one type of firmware). As described below, memory 204 may also comprise a type of firmware (shown as firmware 218) that specifies a policy for firmware 224. Such a firmware is referred herein as policy enforcement firmware. Examples of memory 204 include, but are not limited to, a non-volatile read-only memory device (e.g., flash memory, erasable programmable read-only memory (EPROM), an electrically erasable programmable read-only memory (EEPROM), and/or the like).

Fuse array 214 comprises a plurality of fuse banks 220A, 220B, 220C, and 220D. Each of fuse banks 220A, 220B, 220C, and 220D comprises a plurality of one-time programmable fuses. The fuses may be electronic fuses (i.e., eFuses) or anti-fuses that have one of two different states. An e-fuse is a microscopic fuse in a computer chip, which may be fabricated of a semiconductor material (e.g., silicon) and/or metal traces. An e-fuse may be blown by electromigration or in another suitable manner. However, the embodiments described herein are not so limited. Data may be written (or programmed) to a fuse bank by selectively blowing fuses in the fuse bank, where a blown fuse may correspond to a value of "1", and an unblown fuse may correspond to a value of "0", or vice versa. Each of fuse banks 220A, 220B, 220C, and 220D is configured to store a public key of a particular entity that owns SoC 102. As defined herein, an entity may include, but is not limited to, a person, a company, an organization, an enterprise, etc. In accordance with an embodiment, each of fuse banks 220A, 220B, 220C and 220D stores a hash representative of the public key. The hash may comprise may be a 384-bit hash value. In accordance with such an embodiment, each of fuse banks 220A, 220B, 220C, and 220D comprise 384 fuses. However, it is noted that the hash may comprise any number of bits, including, but not limited to 128 bits, 256 bits, etc., and each of fuse banks 220A, 220B, 220C, and 220D may comprise a corresponding number of fuses. After manufacturing, the fuses of a particular fuse bank (e.g., fuse bank 220A) may be programmed to store the public key of the first owner. The public key may also be hard coded in memory 204 if it is known at the time of tape-out of security processor 200. This guarantees that when security processor 200 is manufactured, it has a default owner to start with before blowing any fuses.

Each of fuse banks 220A, 220B, 220C, and 220D is also associated with an owner revoke fuse. For example, fuse bank 220A is associated with an owner revoke fuse 222A, fuse bank 220B is associated with an owner revoke fuse 222B, fuse bank 220C is associated with an owner revoke fuse 222C, and fuse bank 220D is associated with an owner revoke fuse 222D. Each of owner revoke fuses 222A, 222B, 222B, and 222D may be utilized to invalidate (or revoke) the public key stored in its corresponding fuse bank. Each of owner revoke fuses 222A, 222B, 222B, and 222D may initially be in an unblown state. To revoke a public key, the corresponding revoke fuse may be blown. For example, to revoke a public key stored in bank 220A, owner revoke fuse 222A may be blown. To revoke a public key stored in bank 220B, owner revoke fuse 222B may be blown. To revoke a public key stored in bank 220C, owner revoke fuse 222C may be blown. To revoke a public key stored in bank 220D, owner revoke fuse 222D may be blown.

The fuses of fuse array 214 may be programmed by sending commands to fuse controller 212. The commands may be provided by security processor core 202. Responsive to receiving such commands, fuse controller 212 may program corresponding fuses of fuse array 214 in accordance with the commands.

Access enforcement logic 210 is configured to allow or deny the ability to program the fuses in fuse array 214. For example, access enforcement logic 210 may only allow fuses in fuse array 214 to programmed during valid transfer of ownership operations. For instance, access enforcement logic 210 may send a first command to fuse controller 212, which causes fuse controller 212 to grant requests to program fuses in fuse array 214. When a determination is made that no transfer of ownership is to be performed, access enforcement logic 210 prevents the fuses in fuse array 214 from being programmed. For instance, access enforcement logic 210 may send a second command to fuse controller 212, which causes fuse controller 212 to deny requests to program fuses in fuse array 214. In accordance with an embodiment, fuse controller 212 and access enforcement logic 210 default to preventing fuses in fuse array 214 from being programmed. In accordance with such an embodiment, the second command is not provided to fuse controller 212.

To facilitate the transfer of ownership, the first entity (i.e., the current owner) of the device may author firmware comprising code that causes security processor core 202 to program a fuse bank of fuse banks 220A, 220B, 220C, and 220D with a public key of the new owner and to also revoke the public key of the previous owner (via blowing an owner revoke fuse associated with a fuse bank that stores the previous owner's public key).

During a boot session, security processor core 202 loads and executes boot code 216. Boot code 216, when executed, causes security processor core 202 to copy policy enforcement firmware 218 from memory 204 to memory incorporated within security processor core 202, such as, but not limited to static random access memory (SRAM). In accordance with an embodiment, boot code 216 may cause security processor core 202 verify a public key (e.g., included in the header of policy enforcement firmware 218) to ensure that policy enforcement firmware 218 was provided by an authorized entity. To verify the public key, security processor core 202 may send a read request to fuse controller 212. Fuse controller 212 reads each of fuse banks 220A, 220B, 220C, and 220D and returns the values stored therein to security processor core 202, along with the values represented by associated owner refuse fuses 222A, 222B, 222C, and 222D. Security processor core 202 reads the values returned from fuse controller 212 and determines whether one of the values are equal to the public key associated with the first entity. In the event that the public key is not found in any of fuse banks 220A, 220B, 220C, and 220D, the boot session may fail.

In an embodiment in which fuse banks 220A, 220B, 220C, and 220D are configured to store a hash of the public key, security processor core 202 may provide the public key of the first entity to Cryptography engine 206. Cryptography engine 206 is configured to generate a hash of the public key. Cryptography engine 206 may generate the hash in accordance with an encryption algorithm. Examples of encryption algorithms include, but are not limited to, an advanced encryption standard (AES)-based algorithm, an algorithm based on the secure hash algorithm (SHA), an algorithm based on the public key algorithm (PKA), and/or the like. Cryptography engine 206 returns the hash to security processor core 202.

If a match between the public keys (or their hashes) is found, security processor core 202 uses the public key to verify the signature of policy enforcement firmware 218. In accordance with an embodiment, policy enforcement firmware 218 in encrypted. In accordance with such an embodiment, security processor core 202 may provide policy enforcement firmware 218 to Cryptography engine 206 for decryption thereby. Security processor core 202 then analyzes policy enforcement firmware 218 to determine a policy specified thereby. In accordance with an embodiment, the policy may comprise one or more policy rules. For example, a first rule specifies one or more valid version numbers for firmware 224. For example, policy enforcement firmware 218 may specify an allow list of version numbers of firmware 224 and/or a deny list of version numbers of firmware 224. In another example, a second rule specifies one or more valid hashes of firmware 224. For example, policy enforcement firmware 218 may specify an allow list of hashes of firmware 224 and/or a deny list of hashes of firmware 224. In a further example, a third policy rule specifies one or more valid digital signatures of firmware 224. For example, policy enforcement firmware 218 may specify an allow list of digital signatures of firmware 224 and/or a deny list of digital signatures of firmware 224. It is noted that the policy rules described herein are purely exemplary and that policy enforcement firmware 218 may specify other types of policy rules.

Policy enforcement firmware 218 comprises code (e.g., instructions) that when executed by security processor core 202, causes security processor core 202 to determine whether firmware 224 is in compliance with the policy specified by policy enforcement firmware 218. For example, each firmware of firmware 224 may store various information, such, but not limited to, an identifier of the firmware, a version number thereof, a digital signature, etc. Some or all of such information may be stored in a header of the firmware. Security processor core 202 may read such information and determine whether such information is compliance with the policy specified by policy enforcement firmware 218. In accordance with an embodiment, security processor core 202 may first load each firmware of firmware 224 and subsequently read the information described above. In accordance with such an embodiment, firmware 224 may be loaded into memory incorporated within security processor core 202 (e.g., SRAM).

For example, code of policy enforcement firmware 218 may cause security processor core 202, when executed thereby, to determine whether each firmware of firmware 224 compiles with the first policy rule (as described above). For instance, security processor core 202 may compare the version number of each firmware of firmware 224 to version numbers of the allow list and/or deny list of version numbers specified by policy enforcement firmware 218. The allow list and/or deny list of version numbers may associate each version number specified thereby with an identifier of the firmware associated therewith. For each firmware of firmware 224, security processor core 202 may determine the identifier for that firmware and determine an associated version number specified therefor in the allow list and/or deny list. If the version number of the firmware is included in the allow list, then security processor core 202 determines that the firmware is in compliance with the first policy rule. If the version number is not included in the allow list and/or is included in the deny list, then security processor core 202 determines that the firmware is not in compliance with the first policy rule.

In another example, code of policy enforcement firmware 218 may cause security processor core 202, when executed thereby, to determine whether each firmware of firmware 224 complies with the second policy rule (as described above). For instance, security processor core 202 may determine and compare the hash of each firmware of firmware 224 to hash numbers of the allow list and/or deny list of hashes specified by policy enforcement firmware 218. The allow list and/or deny list of hashes may associate each hash specified thereby with an identifier of the firmware associated therewith. For each firmware of firmware 224, security processor core 202 may determine the hash of the firmware by providing the firmware to Cryptography engine 206. Cryptography engine 206 generates a hash of the firmware in accordance with an encryption algorithm. Examples of encryption algorithms include, but are not limited to, an advanced encryption standard (AES)-based algorithm, an algorithm based on the secure hash algorithm (SHA), an algorithm based on the public key algorithm (PKA), and/or the like. Cryptography engine 206 returns the hash to security processor core 202. Security processor core 202 compares the hash to the hash specified for the firmware (via the firmware identifier) in the allow list and/or deny list. If the hash of the firmware is included in the allow list, then security processor core 202 determines that the firmware is in compliance with the second policy rule. If the hash is not included in the allow list and/or is included in the deny list, then security processor core 202 determines that the firmware is not in compliance with the second policy rule.

In a further example, code of policy enforcement firmware 218 may cause security processor core 202, when executed thereby, to determine whether each firmware of firmware 218 complies with the third policy rule (as described above). In accordance with an embodiment, to validate the digital signature for each firmware of firmware 224, security processor core 202 may provide the firmware to Cryptography engine 206. Cryptography engine 206 generates a hash of the firmware in accordance with an encryption algorithm. Cryptography engine 206 returns the hash to security processor core 202. Cryptography engine 206 may also validate the digital signature of the firmware using the entity's public key in accordance with a decryption algorithm. The public key may be provided in the firmware itself (e.g., in the header), in memory 204, and/or a fuse bank of fuse banks 220A, 220B, 220C, and 220D. Cryptography engine 206 provides the decrypted digital signature to security processor core 202. Security processor core 202 compares the hash generated by Cryptography engine 206 to the decrypted digital signature of the firmware. If the hash and the decrypted digital signature match, then security processor core 202 determines that the firmware is in compliance with the third policy rule. If the hash and the decrypted digital signature do not match, then security processor core 202 determines that the firmware is not in compliance with the third policy rule.

In accordance with another embodiment, security processor core 202 may compare the decrypted digital signature to digital signatures included in an allow list and/or deny list of digital signatures specified by policy enforcement firmware 218. The allow list and/or deny list of digital signatures may associate each digital signature specified thereby with an identifier of the firmware associated therewith. Security processor core 202 may compare the decrypted digital signature provided by Cryptography engine 206 to the digital signature of the firmware (as identified by the firmware's identifier) in the allow list and/or deny list. If the decrypted signature matches a digital signature in the allow list, then security processor core 202 determines that the firmware is in compliance with the third policy rule. If the decrypted signature does not match a digital signature in the allow list and/or matches a digital signature in the deny list, then security processor core 202 determines that the firmware is not in compliance with the third policy rule.

Based at least on a determination that a particular firmware of firmware 224 is in compliance with all the policy rules specified by policy enforcement firmware 218, security processor core 202 executes the particular firmware. Based at least on a determination that a particular firmware of firmware 224 is not in compliance with at least one of the policy rules specified by policy enforcement firmware 218, security processor core 202 performs a mitigation with respect to the particular firmware. For example, security processor core 202 may generate and log an event indicating that the particular firmware is not in compliance. For instance, security processor core 202 may generate and store log 226 in memory 204, which stores the event. Log 226 may specify the policy rule(s) that the firmware is not in compliance with and/or specify the policy rule(s) that the firmware is in compliance with. Log 226 may further specify the version numbers, hashes, and/or digital signatures of each firmware of firmware 224 that were in violation of the policy rule(s). Log 226 may be subsequently analyzed to root cause the reason as to why a particular firmware was determined to be not in compliance. It is noted that log 226 may also be generated when firmware is in compliance with all the policy rules. In this case, log 226 specifies the policy rules that the firmware is in compliance with.

In accordance with an embodiment, based at least on a determination that a particular firmware of firmware 224 is not in compliance, security processor core 202 does not execute the particular firmware. In certain scenarios, the computing device on which firmware was loaded may fail to boot or not boot properly as a result of not executing the firmware. In such scenarios, log 226 may be accessed and/or retrieved via a baseboard management controller (not shown).

In accordance with another embodiment, based at least on a determination that a particular firmware of firmware 224 is not in compliance, security processor core 202 still executes the particular firmware. In accordance with such an embodiment, a computing process may periodically retrieve and/or analyze log 226 to determine whether or not particular firmware of firmware 224 is in compliance with the policy specified by policy enforcement firmware 218. The computing process may be an operating system process of an operating or a software application, for example, executing on one or more of CPU cores 104A-104D. In an example, based at least on a determination that particular firmware of firmware 224 is not in compliance, the computing process may power down the device on which such firmware is installed. In another example, based at least on a determination that particular firmware of firmware 224 is not in compliance, the computing device may prevent the device on which the particular firmware is installed from accessing certain resources (e.g., files, directories, databases, etc.). After mitigating the incompliant firmware, log 226 may be analyzed to determine the reason for incompliance. Log 226 may be accessed and/or retrieved via the baseboard management controller.

In accordance with an embodiment, the policy specified by policy enforcement firmware 218 is configurable. For example, policy enforcement firmware 224 may expose an application programming interface (API) 228 that is accessible by a computing process, such as, an operating system process of an operating system. The operating system executes on one or more of CPU cores 104A-104D and does not execute on security processor 106. The operating system may provide one or more policy parameters to policy enforcement firmware 224 via API 228. The policy parameter(s) include, but are not limited to, an identifier of the firmware for which the policy parameter(s) are provided, a version number of the firmware, a hash of the firmware, a digital signature of the firmware, etc. Responsive to receive such policy parameter(s), the policy rule(s) of policy enforcement firmware 224 are updated. For instance, security processor core 202 may cause such policy parameter(s) to be written to policy enforcement firmware 224. The updated policy may be implemented and enforced the next time the computing device on which the firmware is installed (e.g., SoC 102) is restarted and initiates a boot session. As an added security measure, the policy parameters may be provided via a configuration file that is digitally signed by an entity (e.g., the owner of SoC 102) authorized to update and/or change the policy. Security processor core 202 may validate the digital signature in accordance with embodiments described herein and update the policy only if the digital signature is deemed to be valid.

Figure 3:
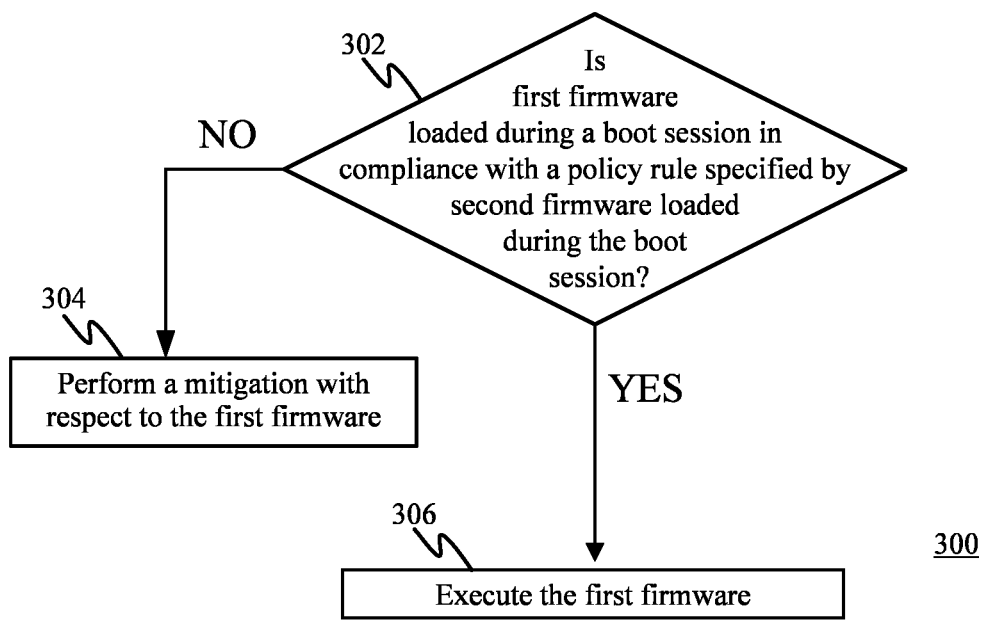
FIG. 3 depicts a flowchart of an example method performed by a processor circuit of a computing device for enforcing a policy for firmware in accordance with an example embodiment.

Accordingly, a policy for firmware installed on a device may be enforced in any ways. For example, FIG. 3 depicts a flowchart 300 of an example method performed by a processor circuit of a computing device for enforcing a policy for firmware in accordance with an example embodiment. In an embodiment, flowchart 300 may be implemented by security processor 200. Accordingly, the method of flowchart 300 will be described with continued reference to security processor 200 of FIG. 2, although the method is not limited to that implementation. Other structural and operational embodiments will be apparent to persons skilled in the relevant art(s) based on the discussion regarding flowchart 300 and security processor 200 of FIG. 2.

As shown in FIG. 3, the method of flowchart 300 begins at step 302, in which, during a boot session of the computing device, a determination is made as to whether first firmware loaded during the boot session is in compliance with at least one policy rule specified by second firmware loaded during the boot session. Based at least on a determination that the first firmware is not in compliance with the at least one policy rule, flow continues to step 304. Otherwise, flow continues to step 306. For example, with reference to FIG. 2, policy enforcement firmware 218 may comprise code that, when executed, causes security processor core 202 to determine whether firmware 224 loaded during the boot session is in compliance with at least one policy rule specified by policy enforcement firmware 218 loaded during the boot session.

In accordance with one or more embodiments, the at least one policy rule comprises at least one of a first policy rule that specifies a valid version number of the first firmware, a second policy rule specifies a valid hash of the first firmware, or a third policy rule that specifies a valid digital signature of the first firmware. For example, with reference to FIG. 2, policy enforcement firmware 218 comprises a first policy rule that specifies a valid version number of firmware 224, a second policy rule that specifies a valid hash of firmware 224 and/or a third policy rule that specifies a valid digital signature of firmware 224.

At step 304, based at least on a determination that the first firmware is not in compliance with the at least one policy rule, a mitigation is performed with respect to the first firmware. For example, with reference to FIG. 2, security processor core 202 may execute code of policy enforcement firmware 218 that causes security processor core 202 to perform a mitigation with respect to firmware 224.

In accordance with one or more embodiments, the mitigation comprises preventing the execution of the first firmware. For example, with reference to FIG. 2, security processor core 202 prevents the execution of firmware 224 (i.e., security processor core 202 does not execute firmware 224).

In accordance with one or more embodiment, the mitigation is performed in accordance with FIG. 4, which is described below.

In accordance with one or more embodiments, the second firmware comprises an application programming interface configured to receive, from an operating system, policy parameters for the at least one policy rule. For example, with reference to FIG. 2, policy enforcement firmware 218 comprises API 228 that is configured to receive, from an operating system, policy parameters for the at least one policy rule.

In accordance with one or more embodiments, the operating system executes on a central processing circuit of a plurality of central processing circuit cores. For example, with reference to FIG. 1, the operating system executes on one or more of CPU cores 104A-104D.

In accordance with one or more embodiments, the processing circuit is implemented on a same die as the plurality of central processing circuit cores. For example, with reference to FIG. 1, the processor circuit (i.e., security processor 106) is implemented on a same die as CPU cores 104A-104D.

At step 304, based at least on a determination that the first firmware is in compliance with the at least one policy rule, a first firmware is executed. For example, with reference to FIG. 2, security processor core 202 may execute firmware 224.

Figure 4:
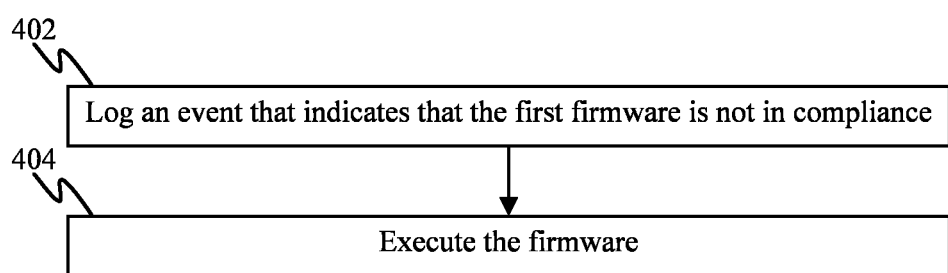
FIG. 4 depicts a flowchart of an example method performed by a processor circuit of a computing device for performing a mitigation with respect to firmware that is determined to be incompliant with a policy in accordance with an example embodiment.

FIG. 4 depicts a flowchart 400 of an example method performed by a processor circuit of a computing device for performing a mitigation with respect to firmware that is determined to be incompliant with a policy in accordance with an example embodiment. In an embodiment, flowchart 400 may be implemented by security processor 200. Accordingly, the method of flowchart 400 will be described with continued reference to security processor 200 of FIG. 2, although the method is not limited to that implementation. Other structural and operational embodiments will be apparent to persons skilled in the relevant art(s) based on the discussion regarding flowchart 400 and security processor 200 of FIG. 2.

As shown in FIG. 4, the method of flowchart 400 begins at step 402, in which an event is logged that indicates that the first firmware is not in compliance. For example, with reference to FIG. 2, security processor core 202 logs an event in log 226. The event indicates that firmware 224 is not in compliance.

At step 404, the first firmware is executed. For example, with reference to FIG. 2, security processor 202 executes firmware 224.

III. Example Computer System Implementation

The systems and methods described above, including the policy enforcement of firmware in reference to FIGS. 1-4, may be implemented in hardware, or hardware combined with one or both of software and/or firmware. For example, boot code 216 and policy enforcement firmware 218, firmware 224, log 226, API 228, and/or flowcharts 300 and 400 may be each implemented as computer program code/instructions configured to be executed in one or more processors (e.g., security processor core 202) and stored in a computer readable storage medium (e.g., memory 204). Security processor 106, CPU cores 104A-104D, memory 204, security processor core 202, Cryptography engine 206, access enforcement logic 210, fuse controller 212, and fuse array 214 may be implemented as hardware logic/electrical circuitry. In an embodiment, security processor 106, CPU cores 104A-104D, memory 204, security processor core 202, Cryptography engine 206, access enforcement logic 210, fuse controller 212, and fuse array 214, and/or each of the components described therein, and flowcharts 300 and/or 400, may be implemented in one or more SoCs (system on chip) (e.g., SoC 102). An SoC may include an integrated circuit chip that includes one or more of a processor (e.g., CPU cores 104A-104D), microcontroller, microprocessor, digital signal processor (DSP), security processor 106, etc.), memory (e.g., memory 204), one or more communication interfaces (e.g., bus interconnects 108 and 208), and/or further circuits, and may optionally execute received program code and/or include embedded firmware to perform functions.

Figure 5:
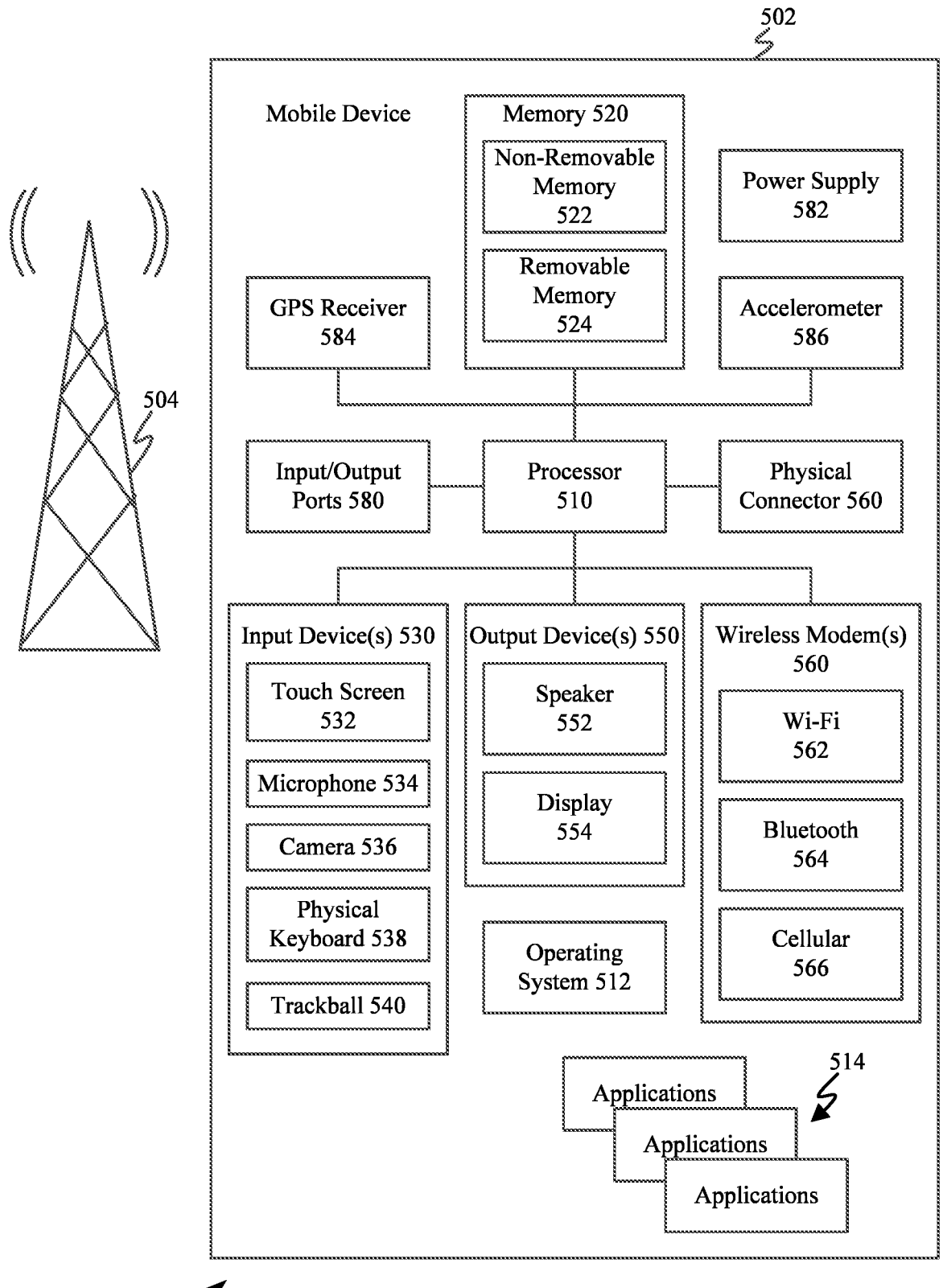
FIG. 5 depicts a flowchart of a method for validating a request for elevated privileges in accordance with a further example embodiment.

FIG. 5 shows a block diagram of an exemplary mobile device 500 including a variety of optional hardware and software components, shown generally as components 502. Any number and combination of the features/elements of security processor 106, CPU cores 104A-104D, memory 204, security processor core 202, Cryptography engine 206, access enforcement logic 210, fuse controller 212, and fuse array 214, and/or each of the components described therein, and flowcharts 300 and/or 400 may be implemented as components 502 included in a mobile device embodiment, as well as additional and/or alternative features/elements, as would be known to persons skilled in the relevant art(s). It is noted that any of components 502 can communicate with any other of components 502, although not all connections are shown, for ease of illustration. Mobile device 500 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 504, such as a cellular or satellite network, or with a local area or wide area network.

The illustrated mobile device 500 can include a controller or processor referred to as processor circuit 510 (which may comprise CPU cores 104A-104N) for performing such tasks as signal coding, image processing, data processing, input/output processing, power control, and/or other functions. Processor circuit 510 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 510 may execute program code stored in a computer readable medium, such as program code of one or more applications 514, operating system 512, any program code stored in memory 520 (which is an example of memory 204), etc. Operating system 512 can control the allocation and usage of the components 502 and support for one or more application programs 514 (a.k.a. applications, "apps", etc.). Application programs 514 can include common mobile computing applications (e.g., email applications, calendars, contact managers, web browsers, messaging applications) and any other computing applications (e.g., word processing applications, mapping applications, media player applications). Security processor core 202 may be communicatively coupled to processor circuit 510.

As illustrated, mobile device 500 can include memory 520. Memory 520 can include non-removable memory 522 and/or removable memory 524. The non-removable memory 522 can include RAM, ROM, flash memory, a hard disk, or other well-known memory storage technologies. The removable memory 524 can include flash memory or a Subscriber Identity Module (SIM) card, which is well known in GSM communication systems, or other well-known memory storage technologies, such as "smart cards." The memory 520 can be used for storing data and/or code for running operating system 512 and applications 514. Example data can include web pages, text, images, sound files, video data, or other data sets to be sent to and/or received from one or more network servers or other devices via one or more wired or wireless networks. Memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 520. These programs include operating system 512, one or more application programs 514, and other program modules and program data. Examples of such application programs or program modules may include, for example, computer program logic (e.g., computer program code or instructions) for implementing the systems and methods described above, including the embodiments described in reference to FIGS. 1-4.

Mobile device 500 can support one or more input devices 530, such as a touch screen 532, microphone 534, camera 536, physical keyboard 538 and/or trackball 540 and one or more output devices 550, such as a speaker 552 and a display 554.

Other possible output devices (not shown) can include piezoelectric or other haptic output devices. Some devices can serve more than one input/output function. For example, touch screen 532 and display 554 can be combined in a single input/output device. The input devices 530 can include a Natural User Interface (NUI).

Wireless modem(s) 560 can be coupled to antenna(s) (not shown) and can support two-way communications between processor circuit 510 and external devices, as is well understood in the art. The modem(s) 560 are shown generically and can include a cellular modem 566 for communicating with the mobile communication network 504 and/or other radio-based modems (e.g., Bluetooth 564 and/or Wi-Fi 562). Cellular modem 566 may be configured to enable phone calls (and optionally transmit data) according to any suitable communication standard or technology, such as GSM, 3G, 4G, 5G, etc. At least one of the wireless modem(s) 560 is typically configured for communication with one or more cellular networks, such as a GSM network for data and voice communications within a single cellular network, between cellular networks, or between the mobile device and a public switched telephone network (PSTN).

Mobile device 500 can further include at least one input/output port 580, a power supply 582, a satellite navigation system receiver 584, such as a Global Positioning System (GPS) receiver, an accelerometer 586, and/or a physical connector 560, which can be a USB port, IEEE 1394 (FireWire) port, and/or RS-232 port. The illustrated components 502 are not required or all-inclusive, as any components can be not present and other components can be additionally present as would be recognized by one skilled in the art.

Figure 6:
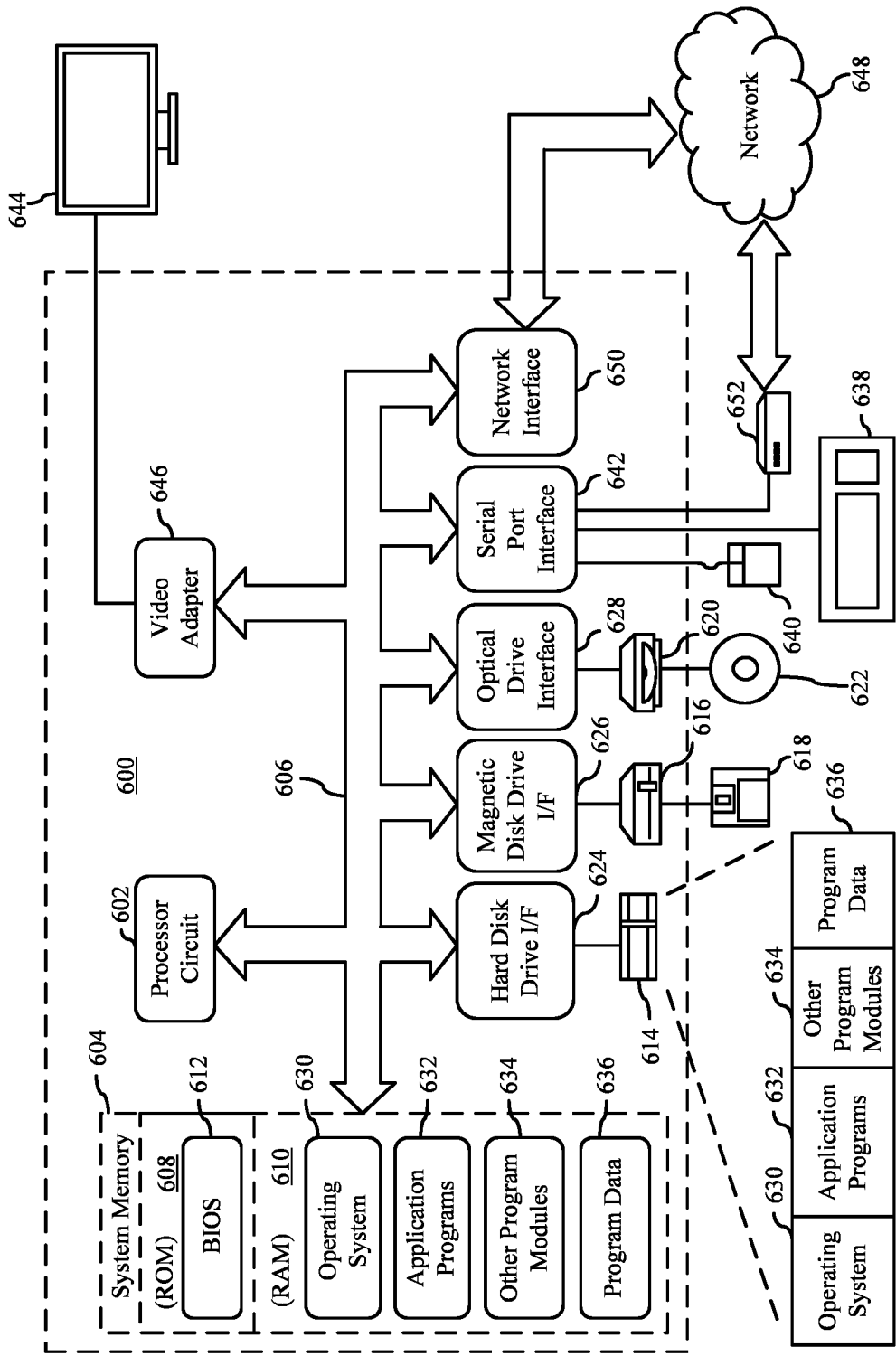
FIG. 6 is a block diagram of an example computing device that may be used to implement embodiments.

FIG. 6 depicts an exemplary implementation of a computing device 600 in which embodiments may be implemented, including security processor 106, CPU cores 104A-104D, memory 204, security processor core 202, Cryptography engine 206, access enforcement logic 210, fuse controller 212, and fuse array 214, and/or each of the components described therein, and flowcharts 300 and/or 400. The description of computing device 600 provided herein is provided for purposes of illustration, and is not intended to be limiting. Embodiments may be implemented in further types of computer systems, as would be known to persons skilled in the relevant art(s).

As shown in FIG. 6, computing device 600 includes one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 (which is an example of memory 204) and random access memory (RAM) 610. A basic input/output system 612 (BIOS) is stored in ROM 608. CPU cores 104A-104D may be included in processor circuit 602. Security processor 106 may be communicatively coupled to processor circuit 602 via bus 606.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing the systems described above, including the embodiments described in reference to FIGS. 1-4.

A user may enter commands and information into the computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to generally refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media (including system memory 604 of FIG. 6). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 652, or any other interface type. Such computer programs, when executed or loaded by an application, enable computing device 600 to implement features of embodiments discussed herein. Accordingly, such computer programs represent controllers of the computing device 600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system includes: at least one processor circuit; a first set of fuses that stores a first public key associated with a first entity; a second set of fuses; and at least one memory that stores first firmware configured to be executed by the at least one processor circuit, the execution of the first firmware causing the at least one processor circuit to: during a boot session of the system: determine whether second firmware loaded during the boot session is in compliance with at least one policy rule specified by the first firmware; based at least on a determination that the second firmware is in compliance with the at least one policy rule, execute the second firmware; and based at least on a determination that the second firmware is not in compliance with the at least one policy rule, perform a mitigation with respect to the second firmware.

In an embodiment of the system, the at least one policy rule comprises at least one of: a first policy rule that specifies a valid version number of the second firmware; a second policy rule specifies a valid hash of the second firmware; or a third policy rule that specifies a valid digital signature of the second firmware.

In an embodiment of the system, the at least one processor is configured to perform the mitigation by: preventing the execution of the second firmware.

In an embodiment of the system, the at least one processor is configured to perform the mitigation by: logging an event that indicates that the second firmware is not in compliance; and executing the second firmware.

In an embodiment of the system, the first firmware comprises an application programming interface configured to receive, from an operating system, policy parameters for the at least one policy rule.

In an embodiment of the system, the operating system executes on a central processing circuit of a plurality of central processing cores.

In an embodiment of the system, the processing circuit is implemented on a same die as the plurality of central processing circuit cores.

A method implemented by a processor circuit of a computing device is also described herein. The method comprises: during a boot session of the computing device: determining whether first firmware loaded during the boot session is in compliance with at least one policy rule specified by second firmware loaded during the boot session; based at least on a determination that the first firmware is in compliance with the at least one policy rule, executing the first firmware; and based at least on a determination that the first firmware is not in compliance with the at least one policy rule, performing a mitigation with respect to the first firmware.

In an embodiment of the method, the at least one policy rule comprises at least one of: a first policy rule that specifies a valid version number of the first firmware; a second policy rule specifies a valid hash of the first firmware; or a third policy rule that specifies a valid digital signature of the first firmware.

In an embodiment of the method, said performing the mitigation comprises: preventing the execution of the first firmware.

In an embodiment of the method, said performing the mitigation comprises: logging an event that indicates that the first firmware is not in compliance; and executing the first firmware.

In an embodiment of the method, the second firmware comprises an application programming interface configured to receive, from an operating system, policy parameters for the at least one policy rule.

In an embodiment of the method, the operating system executes on a central processing circuit of a plurality of central processing circuit cores.

In an embodiment of the method, the processing circuit is implemented on a same die as the plurality of central processing circuit cores.

A computer-readable storage medium having program instructions recorded thereon that, when executed by a processor of a computing device, perform a method, is also described herein. The method includes: during a boot session of the computing device: determining whether first firmware loaded during the boot session is in compliance with at least one policy rule specified by second firmware loaded during the boot session; based at least on a determination that the first firmware is in compliance with the at least one policy rule, executing the first firmware; and based at least on a determination that the first firmware is not in compliance with the at least one policy rule, performing a mitigation with respect to the first firmware.

In an embodiment of the computer-readable storage medium, the at least one policy rule comprises at least one of: a first policy rule that specifies a valid version number of the first firmware; a second policy rule specifies a valid hash of the first firmware; or a third policy rule that specifies a valid digital signature of the first firmware.

In an embodiment of the computer-readable storage medium, said performing the mitigation comprises: preventing the execution of the first firmware.

In an embodiment of the computer-readable storage medium, said performing the mitigation comprises: logging an event that indicates that the first firmware is not in compliance; and executing the first firmware.

In an embodiment of the computer-readable storage medium, the second firmware comprises an application programming interface configured to receive, from an operating system, policy parameters for the at least one policy rule.

In an embodiment of the computer-readable storage medium, the operating system executes on a central processing circuit of a plurality of central processing circuit cores.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system comprising:
 a processor; and
 memory comprising instructions that, when executed, perform operations comprising:
  determining first firmware loaded during a boot session is in compliance with a policy rule specified by second firmware comprising an application programming interface configured to receive policy parameters for the policy rule, wherein the policy rule defines a policy for executing the first firmware; and
  in response to determining the first firmware is in compliance with the policy rule, executing the first firmware.

2. The system of claim 1, wherein:
 the system is a system-on-a-chip (SOC) comprising at least one central processing unit (CPU) core implemented on a die of the SOC; and
 the processor is a security processor that is implemented on the die.

3. The system of claim 2, wherein:
 the at least one CPU core is configured to execute an operating system of a device in which the SOC is included; and
 the security processor is not configured to execute an operating system.

4. The system of claim 1, wherein the processor comprises a hardware security module configured to:
 manage a public key of an entity owning the system; and
 performing at least one of encryption or decryption functions for digital signatures.

5. The system of claim 4, wherein the processor further comprises:
 a fuse array storing the public key of the entity; and
 a fuse controller that manages programming of the fuse array and provides values stored by the fuse array.

6. The system of claim 1, wherein:
 during a boot session of the system:
  a security processor core of the processor copies the second firmware from the memory of the system to the security processor core; and
  the security processor core verifies the second firmware was provided by an authorized entity.

7. The system of claim 1, wherein the policy rule specifies one of:
 a valid version number for the first firmware;
 a valid hash for the first firmware, the hash representing a public key associated with the first firmware; or
 a valid digital signature for the first firmware.

8. A method comprising:
 determining first firmware loaded during a boot session of a computing device is in compliance with a policy rule specified by second firmware comprising an application programming interface configured to receive policy parameters for the policy rule, wherein the policy rule defines a policy for executing the first firmware; and
 in response to determining the first firmware is not in compliance with the policy rule, perform a mitigation with respect to the first firmware.

9. The method of claim 8, further comprising:
 prior to determining the first firmware is in compliance with the policy rule, executing boot code that causes a security processor to verify that the second firmware was provided by an authorized entity.

10. The method of claim 9, wherein verifying that the second firmware was provided by the authorized entity comprises:
 sending a read request to a fuse controller of the computing device;
 receiving values stored by at least one fuse bank of the computing device; and
 determining whether at least one of the values match a public key for an entity associated with the computing device.

11. The method of claim 10, wherein the public key is stored in the second firmware.

12. The method of claim 10, wherein the at least one fuse bank stores a first hash of the public key; and
 determining whether the at least one of the values match the public key comprises:
  providing, by the security processor, the public key to a cryptography engine;
  receiving, from the cryptography engine, a second hash of the public key; and
  comparing the first hash to the second hash.

13. The method of claim 12, wherein determining whether the at least one of the values match the public key comprises:
 determining the first hash matches the second hash; and
 using the second hash to verify a digital signature of the second firmware.

14. The method of claim 8, wherein the mitigation with respect to the first firmware comprises preventing the first firmware from executing.

15. The method of claim 8, wherein the mitigation with respect to the first firmware comprises preventing the computing device from booting.

16. The method of claim 8, wherein the mitigation with respect to the first firmware comprises preventing the computing device from accessing at least one resource.

17. A device comprising:
 a processor; and
 memory comprising instructions that, when executed, perform operations comprising:
  determining first firmware loaded during a boot session is in compliance with a policy rule specified by second firmware comprising an application programming interface configured to receive policy parameters for the policy rule, wherein the policy rule defines a policy for executing the first firmware;
  in response to determining the first firmware is not in compliance with the policy rule, logging an event indicating that the first firmware is not in compliance; and
  executing the first firmware.

18. The device of claim 17, wherein determining the first firmware is in compliance with the policy rule occurs during the boot session.

19. The device of claim 17, wherein the policy parameters comprise at least one of:
 a version number of the first firmware;
 a hash of the first firmware; or
 a digital signature of the first firmware.

20. The device of claim 17, wherein the device is a system-on-a-chip (SOC).

\* \* \* \* \*